United States Patent
Dixit et al.

(10) Patent No.: US 11,978,060 B2
(45) Date of Patent: May 7, 2024

(54) DYNAMIC CATEGORIZATION OF IT SERVICE TICKETS USING NATURAL LANGUAGE DESCRIPTION

(71) Applicant: KYNDRYL, INC., Armonk, NY (US)

(72) Inventors: Archana Dixit, Agra (IN); Kumar Saurabh, Bangalore (IN)

(73) Assignee: KYNDRYL, INC., New York, NY (US)

( * ) Notice: Subject to any disclaimer, the term of this patent is extended or adjusted under 35 U.S.C. 154(b) by 303 days.

(21) Appl. No.: 16/986,543

(22) Filed: Aug. 6, 2020

(65) Prior Publication Data

US 2022/0044254 A1 Feb. 10, 2022

(51) Int. Cl.
*G06Q 30/016* (2023.01)
*G06F 40/279* (2020.01)
*G06N 20/00* (2019.01)
*G06V 30/414* (2022.01)

(52) U.S. Cl.
CPC ......... *G06Q 30/016* (2013.01); *G06F 40/279* (2020.01); *G06N 20/00* (2019.01); *G06V 30/414* (2022.01)

(58) Field of Classification Search
CPC .............................. G06Q 30/016; G06N 20/00
See application file for complete search history.

(56) References Cited

U.S. PATENT DOCUMENTS

| 8,620,842 | B1* | 12/2013 | Cormack | G06F 16/93 706/12 |
| 9,201,967 | B1* | 12/2015 | Zhao | G06Q 30/06 |
| 9,317,829 | B2 | 4/2016 | Anand | |
| 10,067,760 | B2 | 9/2018 | Ryali | |

(Continued)

FOREIGN PATENT DOCUMENTS

EP 3502988 A1 6/2019

OTHER PUBLICATIONS

StackExchange "What is the most scientific way to assign weights to historical data?" Mathematics, Feb. 21, 2014; available at: https://math.stackexchange.com/questions/684519/what-is-the-most-scientific-way-to-assign-weights-to-historical-data (Year: 2014).*

(Continued)

*Primary Examiner* — Brendan S O'Shea
(74) *Attorney, Agent, or Firm* — Zilka-Kotab, P.C.

(57) ABSTRACT

An embodiment for dynamic categorization of information technology (IT) service tickets is provided. The embodiment may include logging an IT service ticket when text is entered into a description field. The embodiment may also include creating a filtered description field by processing the text entered into the description field. The embodiment may further include computing a set of exponential weights and assigning the set of exponential weights to each word in the filtered description field. The embodiment may also include multiplying the set of exponential weights by the word's TF-IDF score to determine an IT service ticket category for placement of the IT service ticket into the IT service ticket category. The embodiment may further include generating features for machine learning, utilizing the generated features to build a supervised machine learning model, and evaluating the supervised machine learning model through analyzation of data from historical IT service tickets.

18 Claims, 5 Drawing Sheets

(56) References Cited

U.S. PATENT DOCUMENTS

| | | | |
|---|---|---|---|
| 10,565,234 B1* | 2/2020 | Sims | G06F 40/12 |
| 2002/0097254 A1* | 7/2002 | Simmons | G06F 11/008 |
| | | | 715/705 |
| 2003/0163380 A1* | 8/2003 | Vaccarelli | G06Q 30/0203 |
| | | | 705/7.32 |
| 2015/0213506 A1* | 7/2015 | Parikh | G06Q 30/0269 |
| | | | 705/14.66 |
| 2018/0285768 A1* | 10/2018 | Karuppasamy | G06N 20/00 |
| 2021/0326896 A1* | 10/2021 | Tran-Cong | G06Q 10/10 |

OTHER PUBLICATIONS

Choi, Woo-Seok, Ki-Cheol Yoo, and S. Choi. "Create List of Stopwords and Typing Error by TF-IDF Weight Value." EasyChair (2019). (Year: 2019).*

Ming, Tuosiyu, Hongchang Chen, and Yizhuo Yang. "A Method of Semantic Redundant Information Filtering for Abstract Meaning Representation Graph." 2018 2nd International Conference on Data Science and Business Analytics (ICDSBA). IEEE, 2018. (Year: 2018).*

Tang, Zhong, Wenqiang Li, and Yan Li. "An improved term weighting scheme for text classification." Concurrency and Computation: Practice and Experience 32.9 (2020): e5604. (Year: 2020).*

Disclosed Anonymously, "A Method to Enable Efficient Ticket Dispatch in an IT Service Environment," IP.com, Publication Date: Jul. 5, 2012, ip.com No. IPCOM000219524D, 7 pages.

Mell et al., "The NIST Definition of Cloud Computing", National Institute of Standards and Technology, Special Publication 800-145, Sep. 2011, 7 pages.

Roy et al., "Technical support ticket classification using Watson Natural Language Classification," IBM Developer, Published Nov. 27, 2018, https://developer.ibm.com/technologies/artificial-intelligence/patterns/watson-studio-nlc-technical-support-ticket-categorization/, 6 pages.

* cited by examiner

DYNAMIC CATEGORIZATION OF IT SERVICE TICKETS USING NATURAL LANGUAGE DESCRIPTION

BACKGROUND

The present invention relates generally to the field of computing, and more particularly to a service ticket logging system.

As technology continues to improve, many people are relying on computers to fulfill their daily needs and to reduce time and effort spent on carrying out basic tasks. The field of Information Technology (IT) Service is no exception. Technological disruption in the IT sector has made lives easier for millions of customers, but it has at the same time generated a much greater number of IT service tickets. It is a natural result that increased versatility regarding computer software would lead to more customers requiring technical support. New computer product launches as well as mobile and desktop application launches will continue to raise technological issues in the short-term. It is therefore imperative for IT Support teams to have a foolproof system in place to dynamically categorize IT service tickets based on natural language description in order to meet the increased demand.

SUMMARY

According to one embodiment, a method, computer system, and computer program product for dynamic categorization of internet technology (IT) service tickets is provided. The embodiment may include logging an IT service ticket when text is entered into a description field. The embodiment may also include creating a filtered description field by processing the text entered into the description field to remove stop words, punctuation marks, dates, and numbers. The embodiment may further include computing a set of exponential weights. Next, the set of exponential weights may be assigned to each word in the filtered description field. The embodiment may also include multiplying the set of exponential weights by the word's TF-IDF score. The multiplying of the set of exponential weights by the word's TF-IDF score may determine an IT service ticket category for placement of the IT service ticket into the IT service ticket category. The embodiment may further include generating features for machine learning. The generated features may be utilized to build a supervised machine learning model. The embodiment may also include evaluating the supervised machine learning model through analyzation of data from historical IT service tickets.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
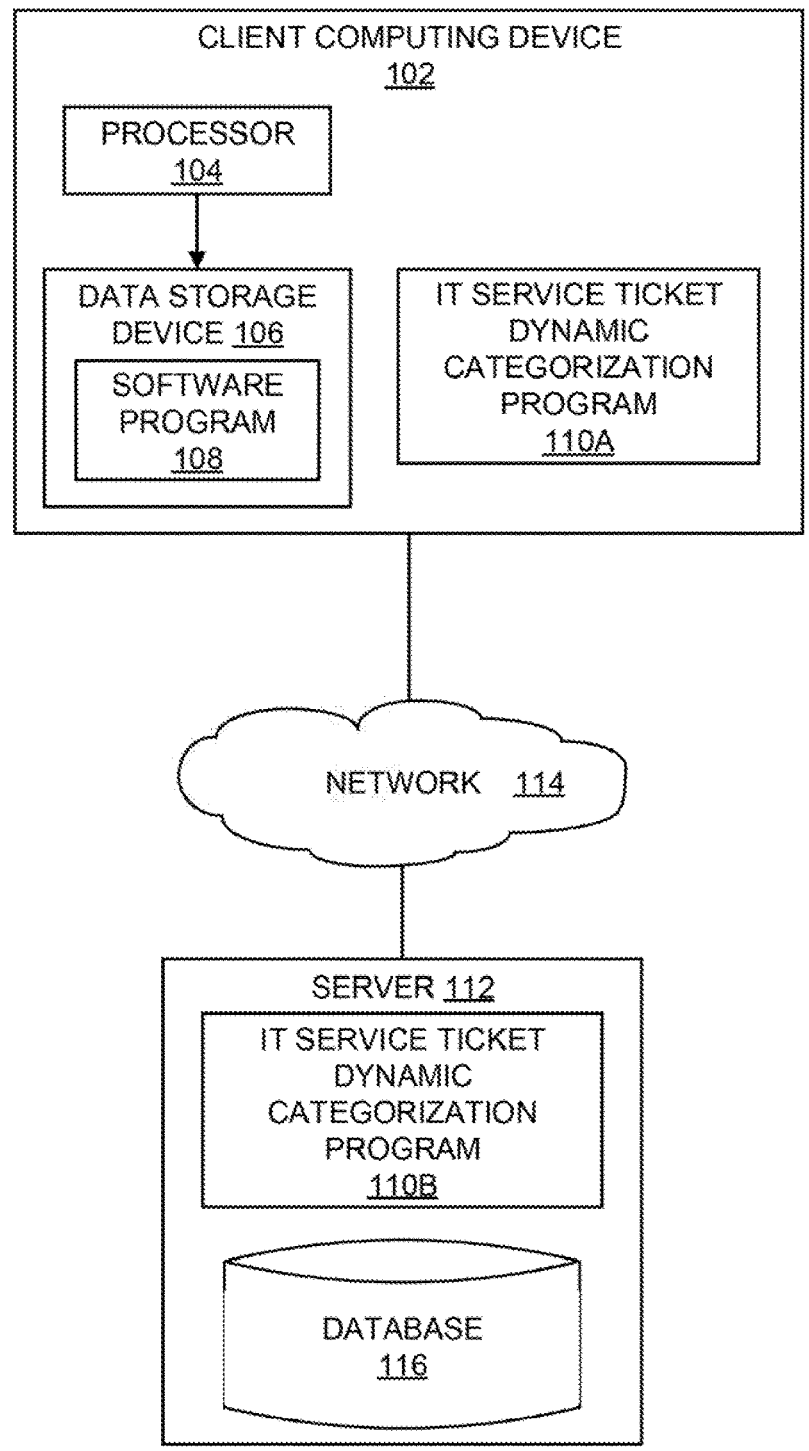
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a service ticket logging system. The following described exemplary embodiments provide a system, method, and program product to, among other things, log an information technology (IT) service ticket via different mediums including, but not limited to, call, email, chat, text message, walk-in, web services, mobile app, and direct input. It is well known that an IT service ticket includes a textual description of an issue entered manually by a ticket creator or directly by a third party who has encountered the issue. The present invention helps in mining this textual description making it unlikely for the IT service ticket to have null data. A general-purpose computer would be incapable of mining through data in this manner for words devoid of value. Therefore, the present invention transforms a general-purpose computer into a special-purpose computer having the capacity to improve the technical field of logging IT service tickets by reliably placing these service tickets into the proper category.

As previously described, rapid improvements in technology will continue to generate a much greater number of IT service tickets. However, despite the increased demand for service, ticket logging systems often do not have well defined ticket categories at the time a service issue arises. For example, IT service tickets are usually manually allocated by a human to a ticket support team. In certain scenarios where categories are defined, they are not intuitive for an end user. Therefore, the end user or ticket creator winds up choosing the wrong category while logging a ticket. Incorrect category assignment leads to IT service tickets being routed to the wrong group and results in longer response time and resolution time hampering productivity, Service Level Agreement timelines, etc. Also, the allocation of resources depends heavily upon the correct categorization of IT service tickets. As such, it is advantageous for the support team to implement a system which can dynamically categorize tickets based on natural language description.

According to at least one embodiment, the present invention may provide an automatic and dynamic categorization of IT service tickets making it possible to categorize these tickets according to the natural language description a person would use to detail a specific issue. Since words occurring at the very beginning of the description are determined to be highly decisive for IT service ticket categorization and identification, the proposed system may assign exponential weights to words based on their position in the description. A set of exponential weights may be computed and applied to all the words in the description. Words at the initial positions may be assigned a higher magnitude of weights, while the weights decrease exponentially as the position increases. For example, if $\alpha$ where $\alpha<1$ is exponential weight, geometric progression 1, $\alpha$, $\alpha^2$, $\alpha^3$, ... $\alpha^n$ is used to assign weights to each word in the description sequence. The total sum of the weights would be $$\frac{1}{1-\alpha}.$$

In at least one other embodiment, these weights can be normalized by dividing geometric progression by the total sum of the weights to get $$\frac{1}{1-\alpha}, \frac{\alpha}{1-\alpha}, \frac{\alpha^2}{1-\alpha}, \frac{\alpha^3}{1-\alpha}, \dots \frac{\alpha^n}{1-\alpha}.$$

These weights may then be multiplied by the word's Term Frequency-Document Frequency (TF-IDF) score. Word importance may therefore be strengthened for words occurring multiple times in the description. These TF-IDF scores when used in supervised machine learning model building may result in higher accuracy and more reliable categorization of IT service tickets.

As mentioned above, the proposed system may assign exponential weights to words based on their position in the description. However, stop words, punctuation marks, and other meaningless words, such as dates and numbers, may first require removal for maximum accuracy. "Stop words" may include words such as "the", "a", "an", and "in". For illustrative purposes, examples include: (1) disk usage is red for nc_hsw_np server in system pulse. kindly address the issue; (2) iphone: unable to log into haiku; (3) access kpim: create ncal kphc access for XYZ person; and (4) cancel open order for lab test: catecholamines fractionation, pediatric. Upon basic cleansing of stop words and punctuation marks, the above issues would be transformed to: (1) disk usage red nc_hsw_np server system pulse address issue; (2) iphone unable log haiku; (3) access kpim create ncal kphc access XYZ person; and (4) cancel open order lab test catecholamines fractionation pediatric.

Each text description is of a different length. When the system assigns a weightage, it would assign them exponentially based on the length of the text description. For example, if $\alpha=0.9$ then a would be 0.9 for the second term "usage" in the $1^{st}$ example above. Likewise, its weight would be 0.9×0.9 for the $3^{rd}$ term "red" in the $1^{st}$ example above. With this computation, weights for the $1^{st}$ example above would be 1, 0.9, 0.81, 0.73, 0.66, 0.59, 0.53, 0.48, and 0.43, respectively. As previously mentioned, these weights are then multiplied by the word's TF-IDF score in order to strengthen word importance according to its occurrence in the description.

The present invention may be a system, a method, and/or a computer program product at any possible technical detail level of integration. The computer program product comprises software instructions which, when implemented by a computer, carry out the exponential weightage computation and assignment according to a word's position in the description field.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to improve the logging of IT service tickets by reliably placing these service tickets into the proper category.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an IT service ticket dynamic categorization program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running a photographic capture setting program 110B and a database 116 and communicating with the client computing device 102 via the communication network 114, in accordance with embodiments of the invention. As will be discussed with reference to FIG. 3, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the IT service ticket dynamic categorization program 110A, 110B may be a program capable of logging an IT service ticket when entering text into a description field, creating a filtered description field by processing the text entered into the description field to remove stop words, punctuation marks, and other meaningless words, such as dates and numbers, computing a set of exponential weights and assigning those weights to each word in the filtered description field, multiplying the exponential weights by the word's TF-IDF score to strengthen the word's importance according to its occurrence in the filtered description field, generating features for machine learning, building a supervised machine learning model, and determining an IT service ticket category. The IT service ticket dynamic categorization method is explained in further detail below with respect to FIG. 2.

Figure 2:
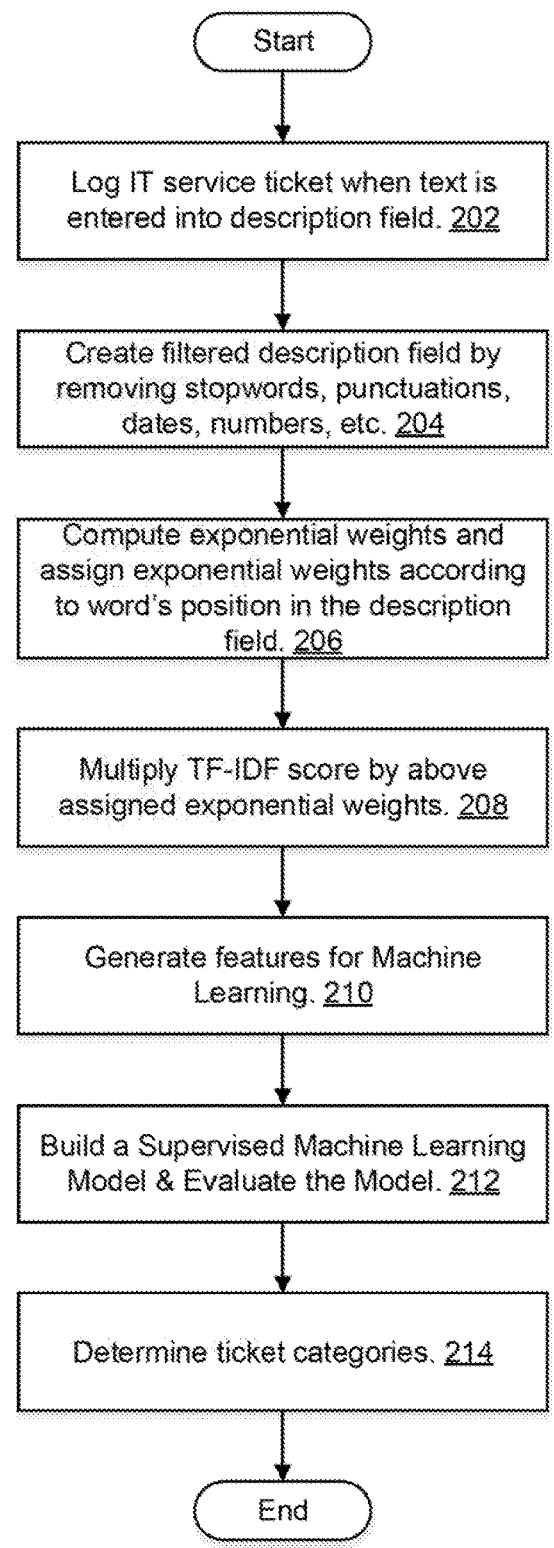
FIG. 2 illustrates an operational flowchart for creating an IT service ticket in a dynamic categorization of IT service tickets process according to at least one embodiment.

Referring now to FIG. 2, an operational flowchart illustrating creating an IT service ticket in a dynamic categorization of IT service tickets process 200 is depicted according to at least one embodiment. First, at 202, the IT service ticket dynamic categorization program 110A, 110B logs the IT service ticket when text is entered into the description field. The IT service ticket may be logged via several different mediums including phone call, email, chat, text message, walk-in, web services, mobile app, and direct input. It is observed that the description field may typically have a pre-defined template to facilitate faster ticket creation for common reoccurring issues. For example, certain specific words that often appear in IT service tickets, such as problem, help, assist, unable, etc., may be pre-populated into the description field. The IT service ticket dynamic categorization program 110A, 110B may help in mining this description field making it unlikely for the IT service ticket to have null data.

Then, at 204, the IT service ticket dynamic categorization program 110A, 110B creates a filtered description field by processing the text entered into the description field to remove stop words, punctuation marks, and other meaningless words, such as dates and numbers, for maximum accuracy. Removal of these items may be accomplished through known technology such as natural language processing. For illustrative purposes, examples include: (1) disk usage is red for nc_hsw_np server in system pulse. kindly address the issue; (2) iphone: unable to log into haiku; (3) access kpim: create ncal kphc access for XYZ person; and (4) cancel open order for lab test: catecholamines fractionation, pediatric.

Upon basic cleansing of stop words and punctuation marks, the above issues would be transformed to: (1) disk usage red nc_hsw_np server system pulse address issue; (2) iphone unable log haiku; (3) access kpim create ncal kphc access XYZ person; and (4) cancel open order lab test catecholamines fractionation pediatric.

Next, at 206, the IT service ticket dynamic categorization program 110A, 110B computes a set of exponential weights and assigns those weights to each word in the filtered description field. Since words occurring at the very beginning of the filtered description field are determined to be highly decisive for IT service ticket categorization and identification, the IT service ticket dynamic categorization program 110A, 110B may assign exponential weights to words based on their position in the filtered description field. Words at the initial positions may be assigned a higher magnitude of weights, while the weights decrease exponentially as the position increases. For example, if $\alpha$ where $\alpha<1$ is exponential weight, geometric progression 1, $\alpha$, $\alpha^2$, $\alpha^3$, ... $\alpha^n$ is used to assign weights to each word in the filtered description field. The total sum of the weights would be $$\frac{1}{1-\alpha}.$$

In at least one other embodiment, these weights can be normalized by dividing geometric progression by the total sum of the weights to get $$\frac{1}{1-\alpha}, \frac{\alpha}{1-\alpha}, \frac{\alpha^2}{1-\alpha}, \frac{\alpha^3}{1-\alpha}, \dots \frac{\alpha^n}{1-\alpha}.$$

Each filtered description field may be of a different length. When the system assigns a weightage, weights may be assigned exponentially based on the length of the filtered description field. For example, if $\alpha=0.9$ then a weight would be 0.9 for the second term "usage" in the above example. Likewise, a weight would be 0.9×0.9 for the 3rd term "red" in the above example. With this computation, weights for the above example maybe 1, 0.9, 0.81, 0.73, 0.66, 0.59, 0.53, 0.48, and 0.43, respectively.

Then, at 208, the IT service ticket dynamic categorization program 110A, 110B multiplies the exponential weights by the word's TF-IDF score to strengthen the word's importance according to its occurrence in the filtered description field. Word importance may therefore be strengthened for words occurring multiple times in the filtered description field. For example, a word may be initially assigned a low weight rating due to its location toward the end of the filtered description field. However, the IT service ticket dynamic categorization program 110A, 110B may recognize the true value of the word in the filtered description field due to its occurring numerous times and assign the word a higher weight rating than it would have otherwise received. In reference to the above example, the word "access" is used twice, in the first position and the sixth position of the filtered description field. "Access" would thus initially be assigned a weight of 1 and 0.59, respectively, for a total weight of 1.59. When multiplying 1.59 by the TF-IDF score, "access" is awarded a final weight greater than its initial weight of 1.59.

Next, at 210, the IT service ticket dynamic categorization program 110A, 110B generates features for machine learning. When the word's TF-IDF score is multiplied by the exponential weights, numeric values may be created for each word in the filtered description field. It is these numeric values that become the features used in the machine learning algorithm. The numeric values may enable the machine learning algorithm to recognize various patterns from the filtered description field to properly categorize the IT service ticket, explained in further detail below.

Then, at 212, the IT service ticket dynamic categorization program 110A, 110B utilizes the aforementioned features in supervised machine learning model building. The features used during the supervised machine learning model building process may result in more reliable categorization of IT service tickets by allowing the machine learning algorithm to recognize and memorize data from historical IT service tickets. For example, when the word "access" is assigned a specific weight rating in a first description, the IT service ticket dynamic categorization program 110A, 110B would recognize if "access" is being used again in a second description and apply that specific weight rating to the second description. The model may be evaluated to determine whether the model is able to assign the relevant categories to the IT service tickets as expected. If the model's classification and predictive power are lower than what is expected, the machine learning algorithm hyperparameters may be changed and the model may be retrained to enhance its predictive power and performance.

Next, at 214, the IT service ticket dynamic categorization program 110A, 110B determines the proper category for the IT service ticket from the multiplying of the set of exponential weights by the word's TF-IDF score and places the IT service ticket into that category. This may be done in any digital spreadsheet.

Figure 3:
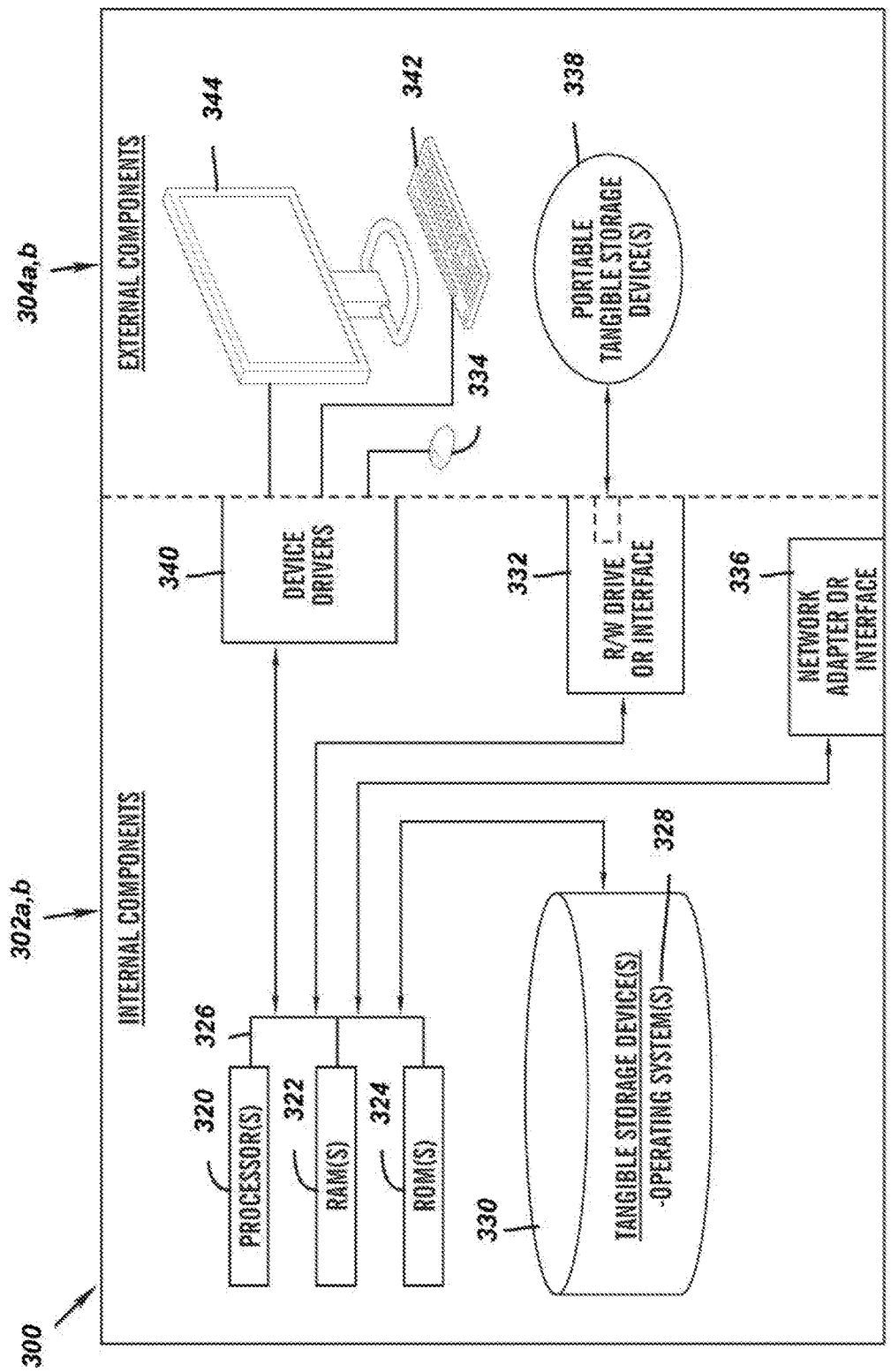
FIG. 3 is a functional block diagram of a software build quality assessment process according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The client computing device 102 and the server 112 may include respective sets of internal components 302a,b and external components 304a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the software program 108 and the IT service ticket dynamic categorization program 110A in the client computing device 102 and the IT service ticket dynamic categorization program 110B in the server 112 are stored on one or more of the respective computer-readable tangible storage devices 330 for execution by one or more of the respective processors 320 via one or more of the respective RAMs 422 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the IT service ticket dynamic categorization program 110A, 110B, can be stored on one or more of the respective portable computer-readable tangible storage devices 338, read via the respective R/W drive or interface 332, and loaded into the respective hard drive 330.

Each set of internal components 302a,b also includes network adapters or interfaces 336 such as a TCP/IP adapter cards, wireless Wi-Fi interface cards, or 3G or 4G wireless interface cards or other wired or wireless communication links. The software program 108 and the IT service ticket dynamic categorization program 110A in the client computing device 102 and the IT service ticket dynamic categorization program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the software program 108 and the IT service ticket dynamic categorization program 110A in the client computing device 102 and the IT service ticket dynamic categorization program 110B in the server 112 are loaded into the respective hard drive 330. The network may comprise copper wires, optical fibers, wireless transmission, routers, firewalls, switches, gateway computers and/or edge servers.

Each of the sets of external components 304a,b can include a computer display monitor 344, a keyboard 342, and a computer mouse 334. External components 304a,b can also include touch screens, virtual keyboards, touch pads, pointing devices, and other human interface devices. Each of the sets of internal components 302a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
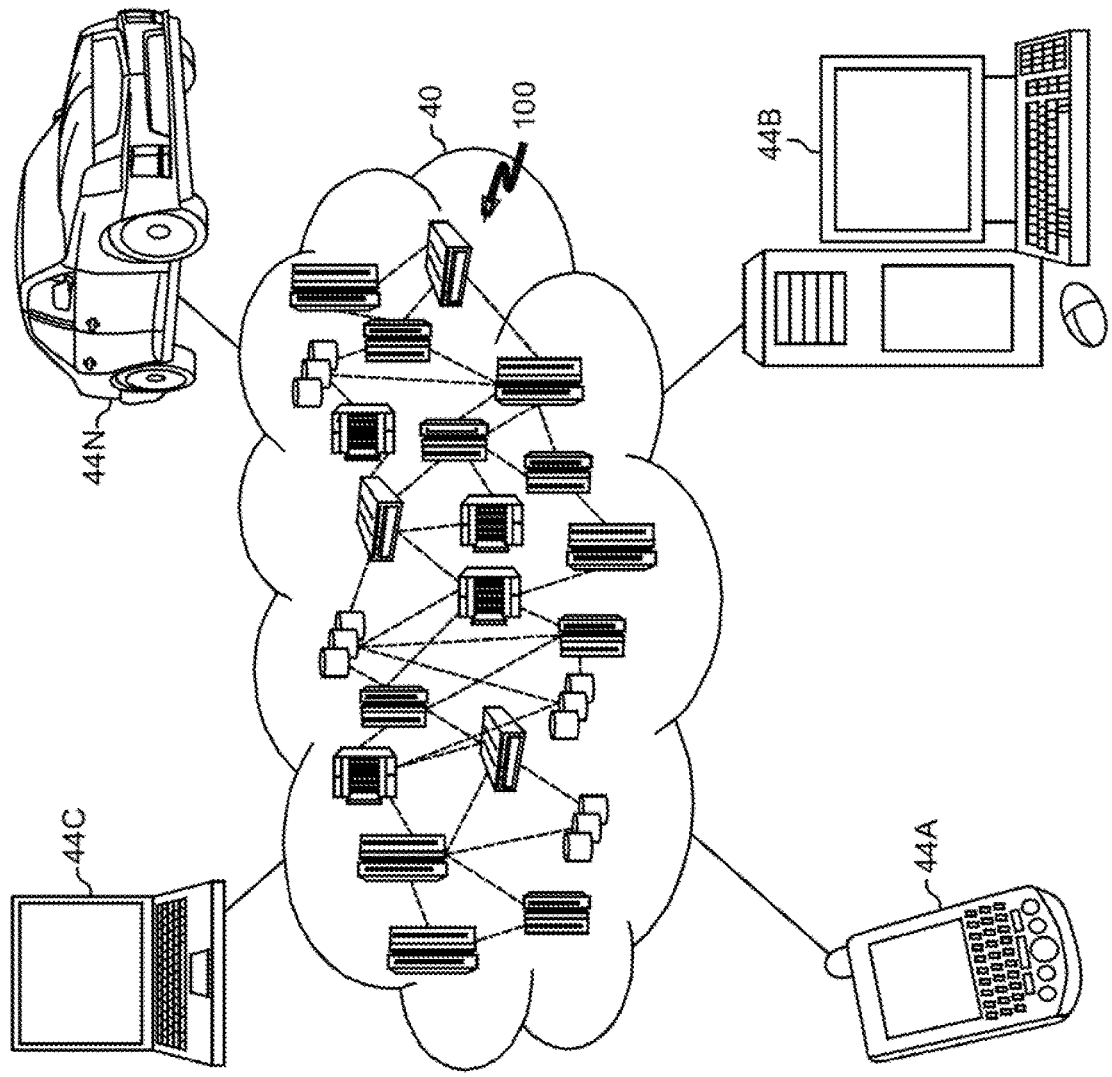
FIG. 4 depicts a cloud computing environment according to an embodiment of the present invention.

Referring now to FIG. 4, illustrative cloud computing environment 40 is depicted. As shown, cloud computing environment 40 comprises one or more cloud computing nodes 100 with which local computing devices used by cloud consumers, such as, for example, personal digital assistant (PDA) or cellular telephone 44A, desktop computer 44B, laptop computer 44C, and/or automobile computer system 44N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 40 to offer infrastructure, platforms and/or software as services for which a cloud consumer does not need to maintain resources on a local computing device. It is understood that the types of computing devices 44A-N shown in FIG. 4 are intended to be illustrative only and that computing nodes 100 and cloud computing environment 40 can communicate with any type of computerized device over any type of network and/or network addressable connection (e.g., using a web browser).

Figure 5:
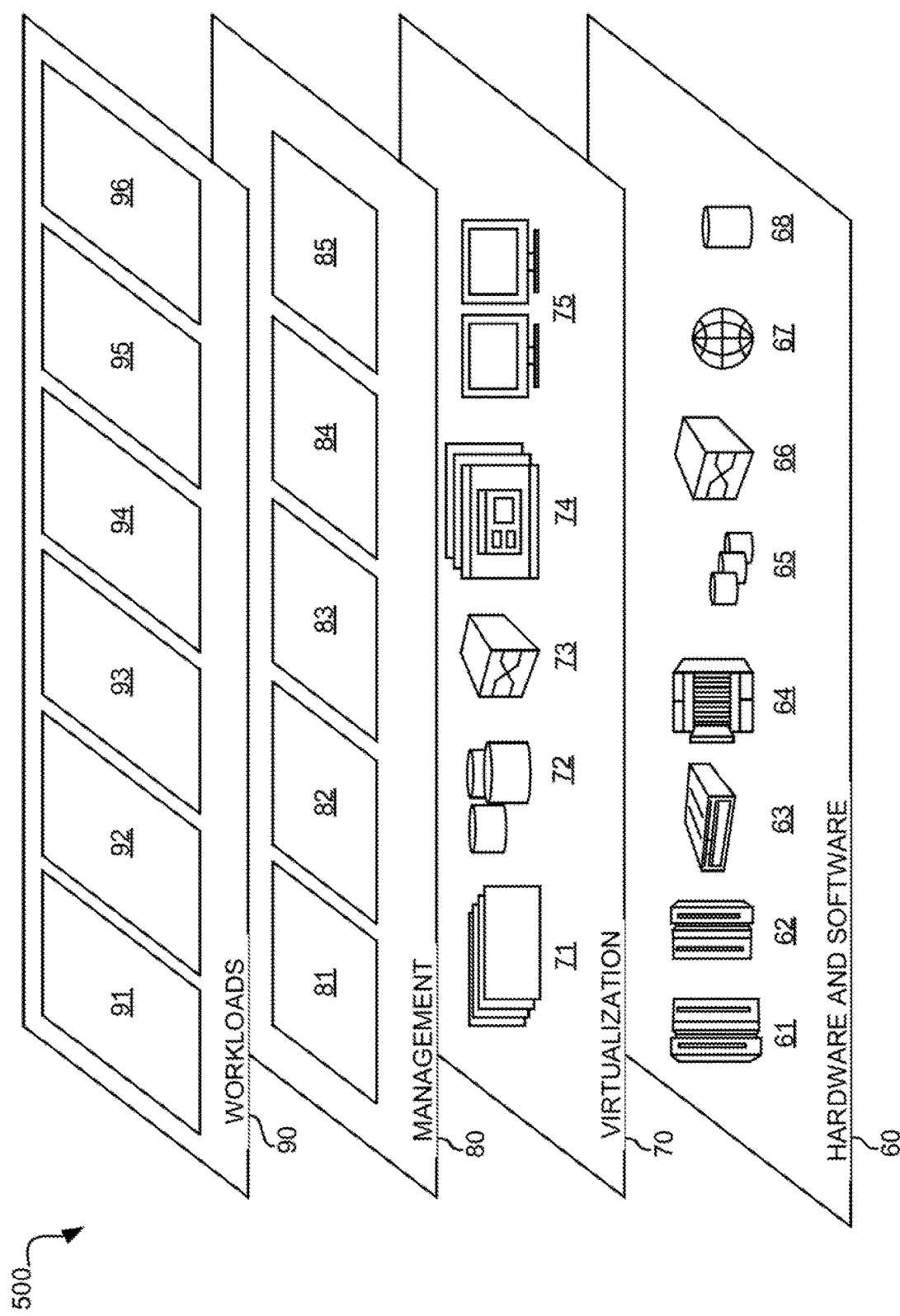
FIG. 5 depicts abstraction model layers according to an embodiment of the present invention.

Referring now to FIG. 5, a set of functional abstraction layers 500 provided by cloud computing environment 40 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic categorization of IT service tickets through natural language description 96. Dynamic categorization of IT service tickets through natural language description 96 may relate to creating and categorizing IT service tickets, as well as supervised machine learning model building to learn and memorize data derived from the natural language description.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of categorizing information technology (IT) service tickets, the method comprising:
   pre-populating a description field of an IT service ticket with words that are predetermined to appear in IT service tickets;

logging the IT service ticket when text is entered into the description field, wherein the text defines a plurality of technological issues;
creating a filtered description field by removing triggers from the text entered into the description field, wherein the triggers are numerical dates;
computing a set of exponential weights based on the text in the filtered description field, wherein the text in the filtered description field includes a plurality of different strings of words, wherein each of the strings of words is associated with a different one of the technological issues;
assigning weightages of the set of exponential weights only to the different strings of words in the filtered description field, wherein the weightages of the exponential weights are assigned to the words of each string of words based on a length of the string of words of the filtered description field, wherein the weightages are assigned to the words in a decreasing value order in each string of words such that words that occur relatively earlier in the string of words are assigned relatively greater weightages than weightages assigned to other words that occur relatively later in the string of words;
multiplying the set of exponential weights by a Term Frequency-Inverse Document Frequency (TF-IDF) score associated with the words; and
determining an IT service ticket category based on a result generated by the multiplying.

2. The method of claim 1, wherein the IT service ticket is logged via a medium selected from a group consisting of phone call, email, chat, text message, walk-in, web services, mobile app, and direct input, wherein the words that are predetermined to appear in IT service tickets are selected from the group of words consisting of: help, assist and unable.

3. The method of claim 1, wherein geometric progression $1, \alpha, \alpha^2, \alpha^3, \ldots \alpha^n$ is used to assign the weightages to the words of the strings of words in the filtered description field.

4. The method of claim 3, wherein the geometric progression $1, \alpha, \alpha^2, \alpha^3, \ldots \alpha^n$ is normalized by dividing the geometric progression $1, \alpha, \alpha^2, \alpha^3, \ldots \alpha^n$ by a total sum of weight $$\frac{1}{1-\alpha}$$

to get $$\frac{1}{1-\alpha}, \frac{\alpha}{1-\alpha}, \frac{\alpha^2}{1-\alpha}, \frac{\alpha^3}{1-\alpha}, \ldots \frac{\alpha^n}{1-\alpha},$$

to assign the weightages to the words of the strings of words in the filtered description field.

5. The method of claim 4, further comprising:
generating features for machine learning;
utilizing the generated features for building a supervised machine learning model; and
evaluating the supervised machine learning model through analyzation of data from historical IT service tickets.

6. The method of claim 5, wherein the supervised machine learning model recognizes and memorizes the data from the historical IT service tickets.

7. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
pre-populating a description field of an IT service ticket with words that are predetermined to appear in IT service tickets;
logging the IT service ticket when text is entered into the description field, wherein the text defines a plurality of technological issues;
creating a filtered description field by removing triggers from the text entered into the description field, wherein the triggers are numerical dates;
computing a set of exponential weights based on the text in the filtered description field, wherein the text in the filtered description field includes a plurality of different strings of words, wherein each of the strings of words is associated with a different one of the technological issues;
assigning weightages of the set of exponential weights only to the different strings of words in the filtered description field, wherein the weightages of the exponential weights are assigned to the words based on a length of the string of words of the filtered description field, wherein the weightages are assigned to the words of each string of words based on a length of the string of words of the filtered description field, wherein the weightages are assigned to the words in a decreasing value order in each string of words such that words that occur relatively earlier in the string of words are assigned relatively greater weightages than weightages assigned to other words that occur relatively later in the string of words;
multiplying the set of exponential weights by a Term Frequency-Inverse Document Frequency (TF-IDF) score associated with the words; and
determining an IT service ticket category based on a result generated by the multiplying.

8. The computer system of claim 7, wherein the IT service ticket is logged via a medium selected from a group consisting of phone call, email, chat, text message, walk-in, web services, mobile app, and direct input.

9. The computer system of claim 7, wherein geometric progression $1, \alpha, \alpha^2, \alpha^3, \ldots \alpha^n$ is used to assign the weightages to the words of the strings of words in the filtered description field.

10. The computer system of claim 9, wherein the geometric progression $1, \alpha, \alpha^2, \alpha^3, \ldots \alpha^n$ is normalized by dividing the geometric progression $1, \alpha, \alpha^2, \alpha^3, \ldots \alpha^n$ by a total sum of weight $$\frac{1}{1-\alpha}$$

to get $$\frac{1}{1-\alpha}, \frac{\alpha}{1-\alpha}, \frac{\alpha^2}{1-\alpha}, \frac{\alpha^3}{1-\alpha}, \ldots \frac{\alpha^n}{1-\alpha},$$

to assign the weightages to the words of the strings of words in the filtered description field.

11. The computer system of claim 10, further comprising:
generating features for machine learning;
utilizing the generated features for building a supervised machine learning model; and
evaluating the supervised machine learning model through analyzation of data from historical IT service tickets.

12. The computer system of claim 11, wherein the supervised machine learning model recognizes and memorizes the data from the historical IT service tickets.

13. A computer program product for transforming a general-purpose computer into a special-purpose computer, the computer program product comprising:
one or more computer-readable tangible storage medium and program instructions stored on at least one of the one or more tangible storage medium, the program instructions executable by a processor capable of performing a method, the method comprising:
pre-populating a description field of an IT service ticket with words that are predetermined to appear in IT service tickets;
logging the IT service ticket when text is entered into the description field, wherein the text defines a plurality of technological issues;
creating a filtered description field by removing triggers from the text entered into the description field, wherein the triggers are numerical dates;
computing a set of exponential weights based on the text in the filtered description field, wherein the text in the filtered description field includes a plurality of different strings of words, wherein each of the strings of words is associated with a different one of the technological issues;
assigning weightages of the set of exponential weights only to the different strings of words in the filtered description field, wherein the weightages of the exponential weights are assigned to the words of each string of words based on a length of the string of words of the filtered description field, wherein the weightages are assigned to the words in a decreasing value order in each string of words such that words that occur relatively earlier in the string of words are assigned relatively greater weightages than weightages assigned to other words that occur relatively later in the string of words;
multiplying the set of exponential weights by a Term Frequency-Inverse Document Frequency (TF-IDF) score associated with the words; and
determining an IT service ticket category based on a result generated by the multiplying.

14. The computer program product of claim 13, wherein the IT service ticket is logged via a medium selected from a group consisting of phone call, email, chat, text message, walk-in, web services, mobile app, and direct input, wherein a second of the words that are predetermined to appear in IT service tickets is selected from the group of words consisting of: assist and unable.

15. The computer program product of claim 14, wherein geometric progression $1, \alpha, \alpha^2, \alpha^3, \ldots \alpha^n$ is used to assign the weightages to the words of the strings of words in the filtered description field.

16. The computer program product of claim 15, wherein the geometric progression $1, \alpha, \alpha^2, \alpha^3, \ldots \alpha^n$ is normalized by dividing the geometric progression $1, \alpha, \alpha^2, \alpha^3, \ldots \alpha^n$ by a total sum of weight $$\frac{1}{1-\alpha}$$

to get $$\frac{1}{1-\alpha}, \frac{\alpha}{1-\alpha}, \frac{\alpha^2}{1-\alpha}, \frac{\alpha^3}{1-\alpha}, \cdots \frac{\alpha^n}{1-\alpha},$$

to assign the weightages to the words of the strings of words in the filtered description field.

17. The computer program product of claim 16, further comprising:
generating features for machine learning;
utilizing the generated features for building a supervised machine learning model; and
evaluating the supervised machine learning model through analyzation of data from historical IT service tickets.

18. The computer program product of claim 17, wherein a first of the words that are predetermined to appear in IT service tickets includes the word "help".

* * * * *